United States Patent
Jung et al.

(10) Patent No.: US 10,848,011 B2
(45) Date of Patent: Nov. 24, 2020

(54) APPARATUS AND METHOD FOR DETECTING FOREIGN OBJECT IN WIRELESS POWER TRANSMITTING SYSTEM

(71) Applicant: GE HYBRID TECHNOLOGIES, LLC, Niskayuna, NY (US)

(72) Inventors: Chun Kil Jung, Seoul (KR); Byong Uk Hwang, Incheon (KR)

(73) Assignee: GE Hybrid Technologies, LLC, Niskayuna, NY (US)

(*) Notice: Subject to any disclaimer, the term of this patent is extended or adjusted under 35 U.S.C. 154(b) by 375 days.

(21) Appl. No.: 14/181,531

(22) Filed: Feb. 14, 2014

(65) Prior Publication Data

US 2014/0232199 A1    Aug. 21, 2014

(30) Foreign Application Priority Data

Feb. 20, 2013   (KR) .................... 10-2013-0018183

(51) Int. Cl.
*H02J 50/60* (2016.01)
*H02J 50/80* (2016.01)
(Continued)

(52) U.S. Cl.
CPC .............. *H02J 50/60* (2016.02); *H02J 7/025* (2013.01); *H02J 50/12* (2016.02); *H02J 50/40* (2016.02); *H02J 50/80* (2016.02)

(58) Field of Classification Search
CPC .................................. H02J 50/00; H04B 5/00
(Continued)

(56) References Cited

U.S. PATENT DOCUMENTS 8,766,487 B2 * 7/2014 Dibben ................. H02J 5/005
                                                              307/104
2009/0133942 A1   5/2009 Iisaka et al. ................... 178/43
(Continued)

FOREIGN PATENT DOCUMENTS

CN         101335468 A      12/2008
CN         102763306 A      10/2012
(Continued)

OTHER PUBLICATIONS

Chinese Office Action dated May 17, 2016, issued by the Chinese Patent Office in corresponding application 201410055876.6.
(Continued)

*Primary Examiner* — Adi Amrany
(74) *Attorney, Agent, or Firm* — DeLizio Law, PLLC

(57) ABSTRACT

The present invention provides an apparatus and method for detecting a foreign object in a wireless power transmitting system. The wireless power transmitting apparatus measures an initial transmission power transmitted from the primary core block and performs foreign object detection on the basis of the initial transmission power, once it is found that an initial voltage of an output terminal of the wireless power receiving apparatus connected to an external load is within the range of a reference voltage. By performing foreign object detection while a wireless power receiving apparatus is in an initial setting completion state, before the output of the wireless power receiving apparatus is turned on, delay in detecting foreign objects may be reduced, and a risk due to heating of a foreign object may be avoided.

8 Claims, 6 Drawing Sheets

(51) Int. Cl.
*H02J 50/40* (2016.01)
*H02J 50/12* (2016.01)
*H02J 7/02* (2016.01)

(58) Field of Classification Search
USPC ......................................................... 307/104
See application file for complete search history.

(56) References Cited

U.S. PATENT DOCUMENTS

| | | | | |
|---|---|---|---|---|
| 2009/0174264 A1* | 7/2009 | Onishi | ............... | H02J 5/005 |
| | | | | 307/104 |
| 2009/0206791 A1 | 8/2009 | Jung | | |
| 2009/0322280 A1* | 12/2009 | Kamijo | ............... | H02J 7/025 |
| | | | | 320/108 |
| 2011/0025265 A1* | 2/2011 | Mochida | ............ | G06K 19/0701 |
| | | | | 320/108 |
| 2012/0106319 A1 | 5/2012 | Staring et al. | | |
| 2012/0205988 A1* | 8/2012 | Tanabe | ............... | H02J 7/025 |
| | | | | 307/104 |
| 2012/0212070 A1* | 8/2012 | Tanabe | ............... | H02J 5/005 |
| | | | | 307/104 |
| 2012/0242285 A1* | 9/2012 | Jung | ............... | H02J 7/0029 |
| | | | | 320/108 |
| 2012/0326521 A1 | 12/2012 | Bauer et al. | ............... | 307/104 |
| 2012/0326524 A1 | 12/2012 | Matsumoto et al. | ......... | 307/104 |
| 2013/0127259 A1* | 5/2013 | Lohr | ............... | H01F 38/14 |
| | | | | 307/104 |
| 2013/0257168 A1* | 10/2013 | Singh | ............... | H02J 17/00 |
| | | | | 307/104 |
| 2013/0285618 A1* | 10/2013 | Iijima | ............... | H02J 17/00 |
| | | | | 320/137 |
| 2014/0015334 A1* | 1/2014 | Jung | ............... | H02J 5/005 |
| | | | | 307/104 |
| 2014/0125287 A1* | 5/2014 | Nakano | ............... | H02J 5/005 |
| | | | | 320/128 |
| 2014/0225628 A1* | 8/2014 | Yoon | ............... | G01R 29/0814 |
| | | | | 324/654 |

FOREIGN PATENT DOCUMENTS

| | | | |
|---|---|---|---|
| CN | 102782983 A | 11/2012 | |
| EP | 2770602 | 8/2014 | |
| JP | 2009-124889 A | 6/2009 | |
| JP | 2011-507481 A | 3/2011 | |
| JP | 2011-81475 A | 4/2011 | |
| KR | 1020090089941 | 8/2009 | |
| KR | 1020120112358 | 10/2012 | |
| WO | WO 2009/081115 A1 | 7/2009 | |
| WO | WO 2010/150124 A1 | 12/2010 | |
| WO | WO 2011/118371 A1 | 9/2011 | |

OTHER PUBLICATIONS

European Search Report issued by the EPO dated Jun. 24, 2014 for the corresponding European Application No. 14155063.2-1806.
Chinese Office Action dated Sep. 2, 2015, issued to Chinese Application No. 201410055876.6.
"Chinese Application No. 201410055876 Third Office Action", dated Sep. 26, 2016, 5 pages.
"European Application No. 14155063 Communication pursuant to Article 94(3) EPC", dated Jan. 19, 2016, 4 pages.
"European Application No. 14155063 Communication pursuant to Article 94(3) EPC", dated Mar. 27, 2018, 4 pages.
"European Application No. 14155063 Communication pursuant to Article 94(3) EPC", dated Apr. 28, 2017, 4 pages.
"European Application No. 14155063 Communication pursuant to Article 94(3) EPC", dated Jun. 8, 2015, 4 pages.
"European Application No. 14155063 Communication pursuant to Article 94(3) EPC", dated Aug. 25, 2016, 4 pages.
"Japanese Search Report Application No. 2014-028302", dated Dec. 5, 2014, 12 pages.
"Japanese Written Opinion Application No. 2014-028302", dated Mar. 4, 2015, 4 pages.
"Korean Application No. 10-2013-0018183 Notification of Reason for Refusal", dated Feb. 26, 2019, 5 pages.
"Korean Application No. 10-2013-0018183 Written Opinion", dated Apr. 26, 2019, 4 pages.
"Office Action issued by the Japanese Patent Office dated Dec. 9, 2014 for the corresponding Japanese Application No. 2014-028302", Dec. 9, 2014, 2 pages.
"Qi System Description Wireless Power Transfer", Wireless Power Consortium, vol. 1:Low Power, Part 1:Interface Definition, Version 1.0.1, Oct. 2010, 88 pages.

* cited by examiner

APPARATUS AND METHOD FOR DETECTING FOREIGN OBJECT IN WIRELESS POWER TRANSMITTING SYSTEM

CROSS-REFERENCE TO RELATED APPLICATIONS

This application claims the benefit of priority of Korean Application No. 10-2013-0018183 filed on Feb. 20, 2013 in the Korean Intellectual Property Office, the contents of which are incorporated by reference in their entirety herein.

BACKGROUND OF THE INVENTION

1. Field of the Invention

The present invention is related to wireless power transmission; more particularly, to an apparatus and method for detecting a foreign object in a wireless power transmitting system.

2. Description of the Related Art

In general, an external charger is used to charge portable terminals such as a mobile phone, notebook computer, or PDA by supplying electric energy (or electric power) thereto. Conventional portable terminals include battery cells storing supplied electric energy and a circuit intended for charging and discharging the battery cells, thereby providing electric energy to the portable terminals.

The electrical interface between the charger and the battery cells, through which battery cells are charged with electric energy, may take the form of contacts. A contact-type electrical interface receives commercial electricity, transforms the electricity into voltage and currents relevant to the battery cells, and provides electric energy to the battery cells through the contacts of the corresponding battery cells.

Contacts of this kind require physical cables or use of electrical wires. Therefore, when a large number of terminals requiring the contact-type electric interface for energy are used, a large number of cables tend to occupy considerable workspace and may be unsightly or disorganized because it is not easy to arrange the cables properly. Moreover, the contact-type electrical interface may cause problems such as instant discharge due to a potential difference between contacts, abrasion, risk of fire due to presence of flammable foreign objects, spontaneous discharge, decrease of battery lifetime, and degradation of battery performance.

Recently, to solve the aforementioned problems, charging systems employing wireless power transmission (hereinafter, referred to as wireless power transmitting systems) and control methods for such systems have begun development. A wireless power transmitting method is also called a contactless power transmitting method or no point-of-contact power transmitting method. A wireless power transmitting system comprises a wireless power transmitting apparatus, which provides electric energy through wireless power transmission, and at least one wireless power receiving apparatus, which receives electric energy provided wirelessly from the wireless power transmitting apparatus and charges battery cells with the received electric energy.

Once connections are well secured between a charger and a mobile terminal, a contact-type electrical interface suffers little from obstacles disturbing battery charge, such as foreign objects. In contrast, because of the inherent characteristics of a wireless power transmitting system utilizing no-point-of-contact charge, there is a high chance that foreign objects could be inserted between the wireless power receiving apparatus and wireless power transmitting apparatus during charging. If a foreign object such as a metallic part is present between the wireless power receiving apparatus and wireless power transmitting apparatus, smooth power transmission is impaired due to the foreign object. Furthermore, problems such as damage and even detonation of the corresponding product due to overload and heating of the foreign object may result. Therefore, there is a need for an apparatus and method which detects foreign objects in a wireless power transmitting system.

SUMMARY OF THE INVENTION

An object of the present invention is to provide an apparatus and method which detects foreign objects in a wireless power transmitting system.

Another object of the present invention is to provide an apparatus and method which detects foreign objects based on a current induced in a primary coil of a wireless power transmitting system.

Yet another object of the present invention is to provide an apparatus and method which performs an operation in response to detection of foreign objects in a wireless power transmitting system.

Still another object of the present invention is to provide an apparatus and method of wireless power transmission equipped with a function which detects one or more foreign objects in a wireless power transmission system.

According to one aspect of the present invention, a wireless power transmitting apparatus which detects one or more foreign objects is provided. The apparatus comprises a primary core block coupled with a secondary core block installed in a wireless power receiving apparatus, where the primary core block transmits wireless power to the wireless power receiving apparatus through magnetic induction or magnetic resonance; an electric driving unit which applies an AC (alternating current) signal required for the primary core block to transmit the wireless power; and a control unit connected to the electric driving unit which generates a control signal to control the AC signal.

Once it is found that the initial voltage of an output terminal of the wireless power receiving apparatus connected to an external load is within the range of a reference voltage, the control unit measures the initial transmission power transmitted from the primary core block and performs a foreign object detection on the basis of the initial transmission power.

According to another aspect of the present invention, a method of detecting one or more foreign objects using a wireless power transmitting apparatus equipped with a primary core block is provided. The method comprises applying an AC signal required for transmitting wireless power to the primary core block; transmitting a power signal to a wireless power receiving apparatus, by coupling a secondary core block installed in the wireless power receiving apparatus with the primary core block through magnetic induction or magnetic resonance; checking whether the initial voltage of an output terminal of the wireless power receiving apparatus connected to an external load is within the range of a reference voltage; measuring the initial transmission power transmitted from the primary core block; and performing a foreign object detection on the basis of the initial transmission power.

According to yet another aspect of the present invention, a wireless power receiving apparatus which detects one or more foreign objects is provided. The apparatus comprises a secondary core block coupled with a primary core block installed in a wireless power transmitting apparatus, which receives wireless power from the wireless power transmitting apparatus through magnetic induction or magnetic resonance; a rectification unit connected to the secondary core block, which provides power to a control unit and an external load by performing full-wave rectification on an AC waveform generated from the secondary core block; and a control unit which measures the initial voltage of an output terminal connected to the external load and, if the initial voltage is within the range of a reference voltage, controls the wireless power receiving apparatus to enter a foreign object detection phase.

According to still another aspect of the present invention, a method of detecting one or more foreign objects using a wireless power receiving apparatus equipped with a secondary core block is provided. The method comprises receiving a power signal from a wireless power transmitting apparatus, by being coupled with a primary core block installed in the wireless power transmitting apparatus through magnetic induction or magnetic resonance; performing full-wave rectification on an AC waveform generated from the secondary core block; measuring the initial voltage of an output terminal connected to an external load of the wireless power receiving apparatus; and in case the initial voltage is within the range of a reference voltage, controlling the wireless power receiving apparatus to enter a foreign object detection phase.

Additional aspects and/or advantages of the invention will be set forth in part in the description which follows and, in part, will be obvious from the description, or may be learned by practice of the invention.

BRIEF DESCRIPTION OF THE DRAWINGS

The accompanying drawings, which are included to provide a further understanding of the present invention and constitute a part of specifications of the present invention, illustrate embodiments of the present invention and together with the corresponding descriptions serve to explain the principles of the present invention.

DETAILED DESCRIPTION OF THE EMBODIMENTS

Figure 1:
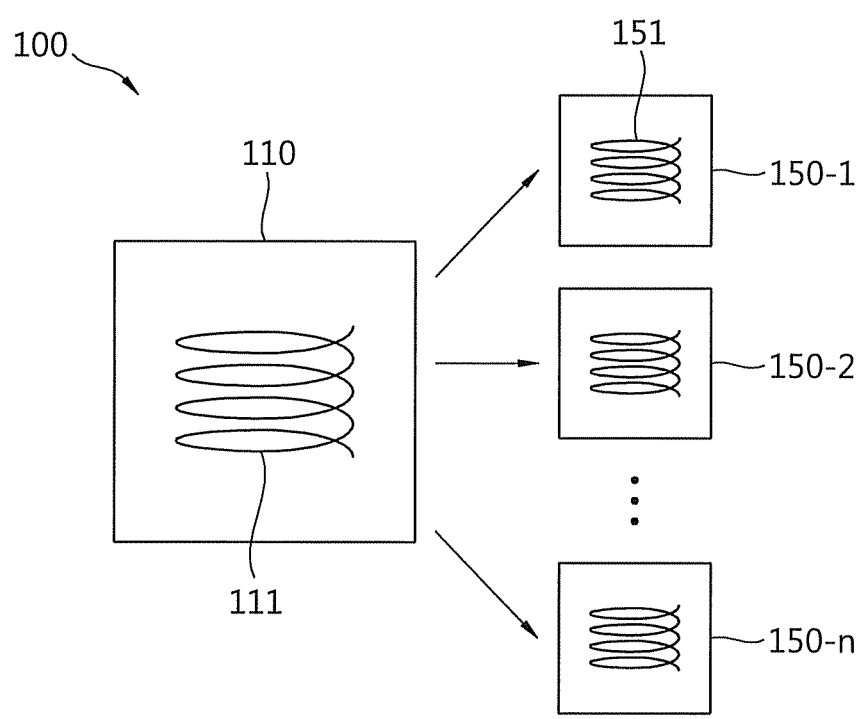
FIG. 1 is a block diagram illustrating constituting elements of a wireless power transmitting system according to one embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

The term "wireless power" is used to denote the energy of arbitrary shape related to electric fields, magnetic fields, and electromagnetic fields transmitted from a transmitter to a receiver without employing physical electromagnetic conductors. The wireless power may be called a power signal and may indicate an oscillating magnetic flux enclosed by a primary and secondary coil. For example, this document describes power transformation of a system intended to charge devices including but not limited to mobile phones, cordless phones, iPods, MP3 players, and headsets wirelessly. In general, basic principles of wireless transfer of energy rely on magnetic inductive coupling, magnetic resonance coupling (for instance, resonance induction) utilizing frequencies below 30 MHz, or both. For relatively high radiation levels, various frequencies below 135 kHz (LF) or above 13.56 MHz (HF), which include license-free frequencies, may be utilized.

FIG. 1 is a block diagram illustrating constituting elements of a wireless power transmitting system according to one embodiment of the present invention.

With reference to FIG. 1, a wireless power transmitting system 100 comprises a wireless power transmitting apparatus 110 and n wireless power receiving apparatuses 150-1, . . . , 150-n. Although a plurality of wireless power receiving apparatuses 150-1, . . . , 150-n are depicted, and will be referred to in reference to FIG. 1 for convenience, the invention is not so limited and may function with only one wireless power receiving apparatus 150-1, as will become clear.

The wireless power transmitting apparatus 110 includes a primary core block. The primary core block may comprise a core and one or more primary coils 111. The wireless power transmitting apparatus 110 may have an arbitrary shape. For example, the apparatus may take the shape of a flat platform with a power transmission surface; each wireless power receiving apparatus 150-1, . . . , 150-n may be disposed on or around the platform.

The wireless power receiving apparatuses 150-1, . . . , 150-n may be separated from the wireless power transmitting apparatus 110. Each of the wireless power receiving apparatuses 150-1, . . . , 150-n is equipped with a secondary core block coupled with an electromagnetic field generated by the primary core block of the wireless power transmitting apparatus 110 in the vicinity thereof. Each secondary core block may comprise one or more secondary coils 151.

The wireless power transmitting apparatus 110 transmits power to the wireless power receiving apparatuses 150-1, . . . , 150-n without a direct electric contact. In this case, the primary core block and secondary core block are referred to as being coupled with each other through magnetic induction or resonance induction. The primary and secondary coil may assume an arbitrary shape relevant to each other; as one example, the coils may be in the form of copper wires wound along the periphery of a block made from a high permeability material such as ferrite or amorphous metal.

The wireless power receiving apparatuses 150-1, . . . , 150-n are connected to an external load (not shown) and provide power received wirelessly from the wireless power transmitting apparatus 110 to the external load. For example, the wireless power receiving apparatuses 150-1, . . . , 150-n may each convey the received power to an object which consumes or stores electric power, such as a portable electric or electronic device, rechargeable battery cell, or battery.

Figure 2:
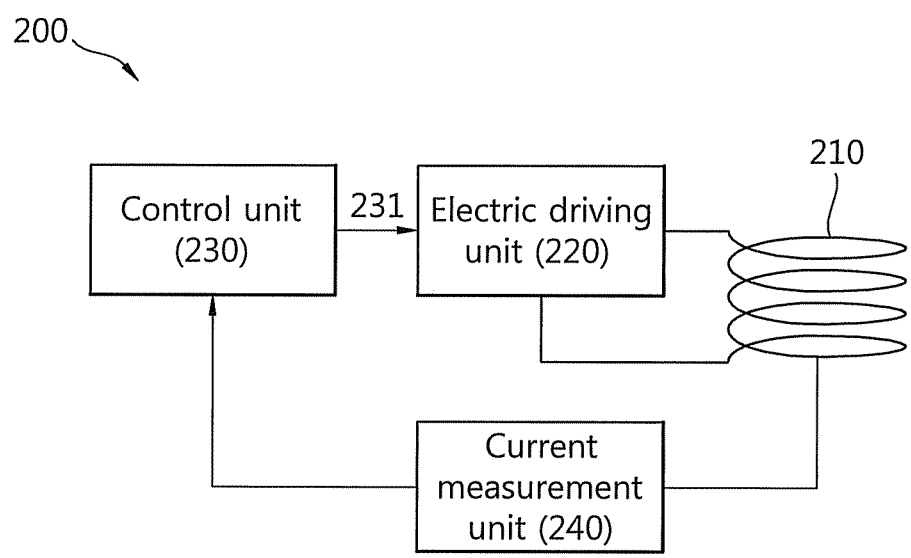
FIG. 2 is a block diagram illustrating a wireless power transmitting apparatus according to one embodiment of the present invention.

FIG. 2 is a block diagram illustrating a wireless power transmitting apparatus according to one embodiment of the present invention.

With reference to FIG. 2, a wireless power transmitting apparatus 200 comprises a primary coil 210, electric driving unit 220, control unit 230, and current measurement unit 240.

The electric driving unit 220 is connected to the primary coil 210 and may apply electric driving signals—for example, AC signals—to the primary coil 210 to generate an electromagnetic field.

The control unit 230 is connected to the electric driving unit 220, generates a control signal 231 which controls an AC signal needed for the primary coil 210 to generate an induced magnetic field or magnetic resonance, and provides the generated control signal to the electric driving unit 220.

The control unit 230 controls the operation of the wireless power transmitting apparatus 200 in a ping phase, ID identification and configuration phase, foreign object detection phase, and power transmission phase. The control unit 230 may generate packets required for each phase and transmit the generated packets to a wireless power receiving apparatus, or receive packets from the wireless power receiving apparatus.

The ping phase may be defined as an attempt to discover an object capable of receiving wireless power. In the ping phase, the control unit 230 performs a digital ping and applies a control signal 231 to the electric driving unit 220 so that the primary coil 210 may transmit a power signal at an operating point. If a correct signal strength packet is received from the wireless power receiving apparatus within a time window, the control unit 230 changes the state of the wireless power transmitting apparatus 200 to the ID identification and configuration phase.

In the ID identification and configuration phase, the control unit 230 identifies the wireless power receiving apparatus and collects configuration information of the wireless power receiving apparatus. At this time, the control unit 230 receives an identification packet from the wireless power receiving apparatus; configuration information may also be received.

In the foreign object detection phase, the control unit 230 performs foreign object detection (FOD). If no foreign object is detected, the control unit 230 changes the state of the wireless power transmitting apparatus 200 to the power transmission phase and applies a control signal 231 to the electric driving unit 220 so that wireless power may be transmitted. In this power transmission phase, the wireless power transmitting apparatus 200 may transmit wireless power to the wireless power receiving apparatus through the primary coil 210. On the other hand, if a foreign object is detected, the control unit 230 stops applying the control signal 231 and enters an emergency mode. According to the phase transition scheme above, before the power transmission phase, foreign object detection is performed. In other words, since foreign object detection is performed right after the wireless power transmitting apparatus 200 and the wireless power receiving apparatus identify (or recognize) each other, a risk due to performing foreign object detection in the middle of transmission of wireless power may be avoided beforehand.

Although the present embodiment separates the foreign object detection phase from the power transmission phase, the two phases may be integrated (or incorporated) into a single phase and controlled as a single phase. Similarly, the foreign object detection phase may be integrated (or incorporated) into the power transmission phase and may be controlled as a single procedure. In what follows, the foreign object detection phase is treated as an independent phase, and descriptions will be provided on the basis of such an assumption, but manners of integrating the phases will be obvious from the description to those of skill in the art.

Figure 3:
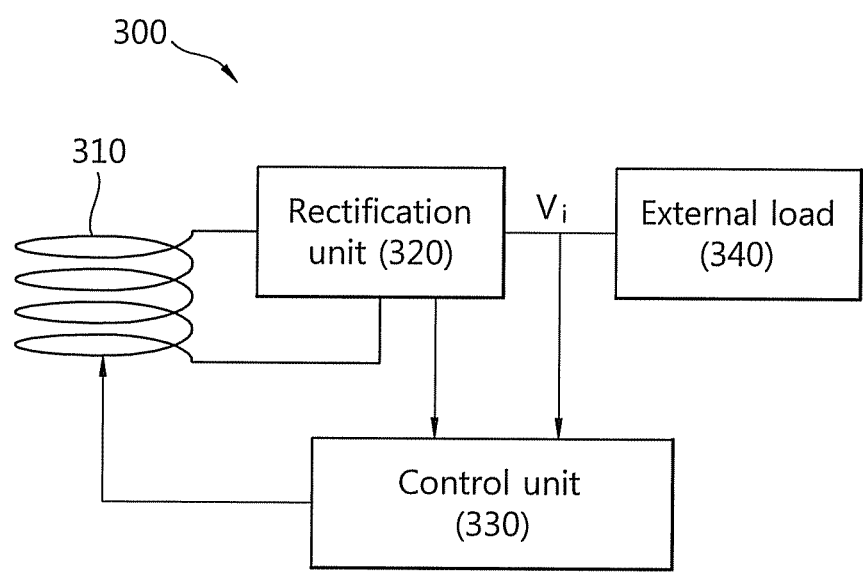
FIG. 3 is a block diagram illustrating a wireless power receiving apparatus according to another embodiment of the present invention.

FIG. 3 is a block diagram illustrating a wireless power receiving apparatus according to another embodiment of the present invention.

With reference to FIG. 3, a wireless power receiving apparatus 300 comprises a secondary coil 310, a rectification unit 320, and a control unit 330.

The rectification unit 320 provides full-wave rectification of an AC waveform generated in the secondary coil 310. For example, the rectification unit 320 may use four diodes forming a full-bridge configuration. Also, the rectification unit 320 may provide power to the control unit 330 and the external load 340.

The control unit 330 receives power from the rectification unit 320 and performs operations such as packet generation and transmission at each phase and control of wireless power transmission. As one example, a load modulation technique may be used for packet transmission. In this case, a packet is transmitted through the secondary coil 310, and the same frequency band as used for wireless power transmission is employed. As another example, a frequency band separate from the frequency band meant for wireless power transmission may be employed for packet transmission, and packets may be transmitted using techniques including but not limited to RFID (Radio Frequency Identification), Bluetooth, or NFC (Near Field Communication).

In the ID identification and configuration phase, the control unit 330 may generate an identification packet indicating a unique ID of the wireless power receiving apparatus 300, and may also generate configuration information of the wireless power receiving apparatus 300. The control unit 330 transmits the identification packet and/or configuration information to a wireless power transmitting apparatus.

The control unit 330 may measure an initial voltage $V_i$ of an output terminal connected to an external load. The initial voltage $V_i$ may be the voltage measured before the power transmission phase where wireless power is received and after the ID identification and configuration phase is completed. Alternatively, the initial voltage $V_i$ may be defined as the voltage of an output terminal measured in a standby before wireless charging starts.

If the initial voltage $V_i$ in a steady state is within a range of a reference voltage (for example, 7.0 V~10.5 V), the control unit 330 enters the foreign object detection phase, generates a foreign object state packet used for foreign object detection, and transmits the foreign object state packet to a wireless power transmitting apparatus. The foreign object state packet is used to initiate or trigger foreign object detection in the wireless power transmitting apparatus.

In the power transmission phase, the control unit 330 measures power received through the secondary coil 310, generates a power control packet, and transmits the generated power control packet to the wireless power transmitting apparatus. The power control packet is used to initiate or trigger power transmission by the wireless power transmitting apparatus. In other words, the control unit 330 may receive required power by using packets necessary for control of wireless power transmission.

Figure 4:
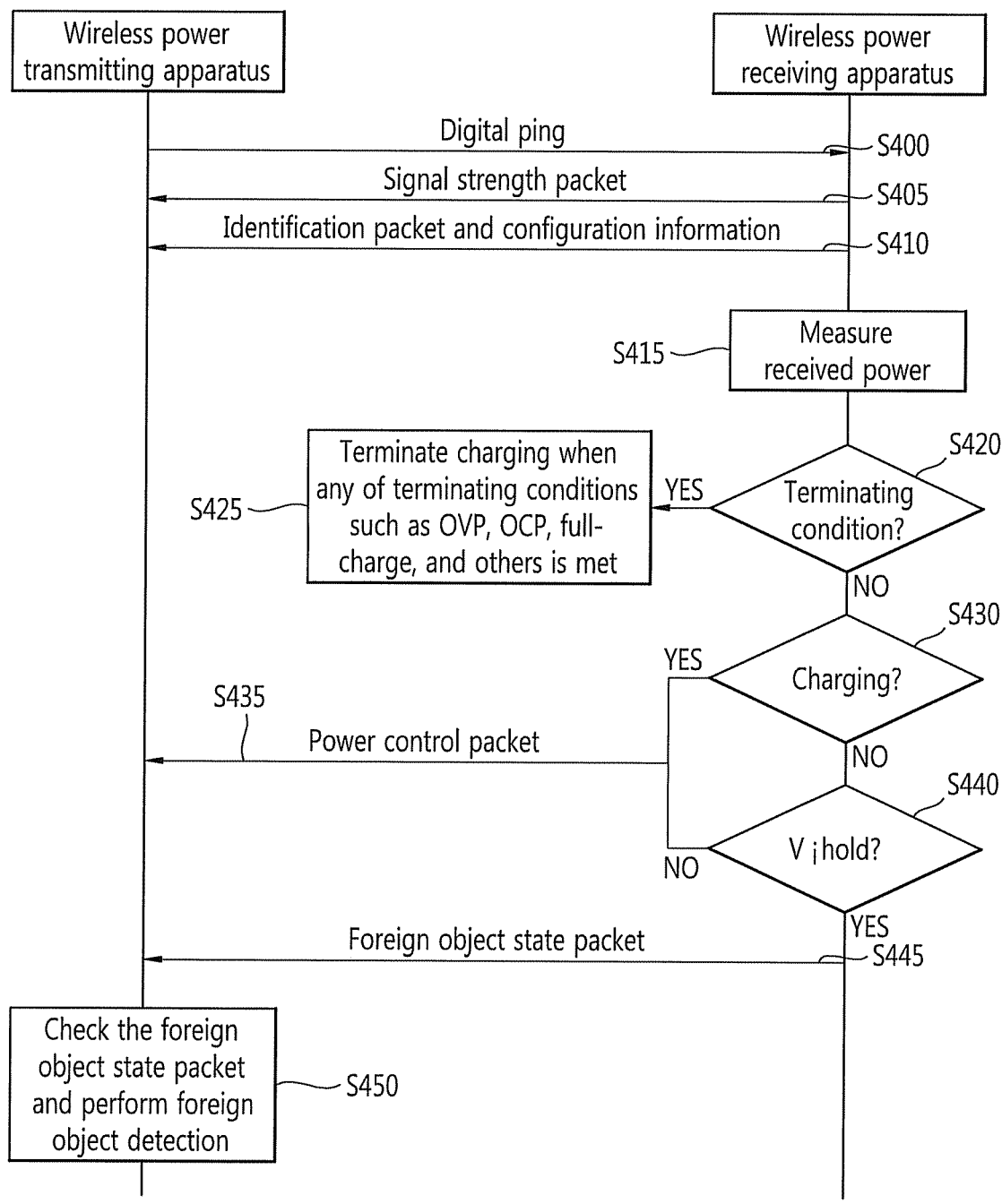
FIG. 4 is a flow diagram illustrating a method for performing foreign object detection in a wireless power transmitting system according to one embodiment of the present invention.

FIG. 4 is a flow diagram illustrating a method for performing foreign object detection in a wireless power transmitting system according to one embodiment of the present invention.

With reference to FIG. 4, the wireless power transmitting apparatus in the ping phase performs a digital ping in which the wireless power transmitting apparatus transmits a power signal at an operating point to a wireless power receiving apparatus at S400.

After receiving a power signal in the ping phase, the wireless power receiving apparatus generates a signal strength packet indicating strength of the received power signal and transmits the signal strength packet to the wireless power transmitting apparatus at S405. The wireless power receiving apparatus also generates an identification packet indicating a unique ID of the wireless power receiving apparatus and configuration information thereof, and transmits the identification packet and configuration information to the wireless power transmitting apparatus at S410.

The wireless power receiving apparatus measures a received power at S415. From this moment, the wireless power receiving apparatus enters a phase meant for setting up an initial voltage $V_i$.

The wireless power receiving apparatus checks whether a terminating condition such as an over voltage power (OVP), over current power (OCP), or full charge is met at S420. If any of the terminating conditions such as OVP, OCP, full charge, or others is met, the wireless power receiving apparatus terminates the charging at S425. If the terminating conditions is not met, the wireless power receiving apparatus checks whether it is in the middle of receiving wireless power from the wireless power transmitting apparatus—that is, whether it is charging—at S430.

If it is determined at S430 that the wireless power receiving apparatus is charging, the wireless power receiving apparatus compares a required power value with a received power value, generates a power control packet based on the comparison, and transmits the generated power control packet to the wireless power transmitting apparatus at S435. If it is determined at S430 that the wireless power receiving apparatus is not charging, the wireless power receiving apparatus checks whether the initial voltage $V_i$ is in a hold stage S440. If the initial voltage $V_i$ in a steady state is within the range of a reference voltage (for example, 7.0 V~10.5 V), the wireless power receiving apparatus completes the initial configuration thereof. By doing so, the initial voltage $V_i$ enters the hold state, and the wireless power receiving apparatus may enter the foreign object detection phase.

If the initial voltage $V_i$ is not in the hold state, the wireless power receiving apparatus generates a power control packet and transmits the generated power control packet to the wireless power transmitting apparatus, in the same way as when the wireless power receiving apparatus is charging, at S435.

If the initial voltage $V_i$ is in the hold state, the wireless power receiving apparatus enters the foreign object detection phase. At this time, the wireless power receiving apparatus generates a foreign object state packet and transmits the generated foreign object state packet to the wireless power transmitting apparatus at S445.

The foreign object state packet, according to one embodiment of the present invention, comprises a preamble, header, message, and checksum. The preamble may consist of a minimum of 11 bits to a maximum of 25 bits, and all of the bits may be set to zero. The preamble allows the wireless power transmitting apparatus to accurately detect a start bit of the header of the foreign object state packet and synchronize with incoming data.

The header indicates a packet type and may be comprised of 8 bits. As one example, the value of the foreign object state packet header may be 0x00. In this case, the content of the message may be set to 0, that is, 0x00. As another example, the value of the foreign object state packet header may be set to 0x05, and the same value may be used as the header of a charge state packet. However, if the value of the one byte message of the charge state packet is set to 0x00, the foreign object state packet may be indicated as well. In other words, the foreign object state packet may be included in the charge state packet based on the message of the charge state packet. Other values and corresponding meanings are also possible without departing from the scope of the invention.

The wireless power transmitting apparatus determines, on the basis of the header value of a received packet or the value of a received message, whether the received packet is the foreign object state packet. If it is determined that the foreign object state packet has been received, the wireless power transmitting apparatus performs foreign object detection at S450. The operations of checking the foreign object state packet and foreign object detection are performed by the control unit 230 of the wireless power transmitting apparatus.

In the following paragraphs, the operation of foreign object detection performed by the wireless power transmitting apparatus will be described in more detail with reference to an additional drawing. For the purposes of the following paragraphs, foreign object detection by the wireless power transmitting apparatus may be regarded to be the same as the foreign object detection performed by the control unit 230 of the wireless power transmitting apparatus; however, it will be recognized that other components of the wireless power transmitting apparatus, including ones not previously described, may conduct one or both operations.

Figure 5:
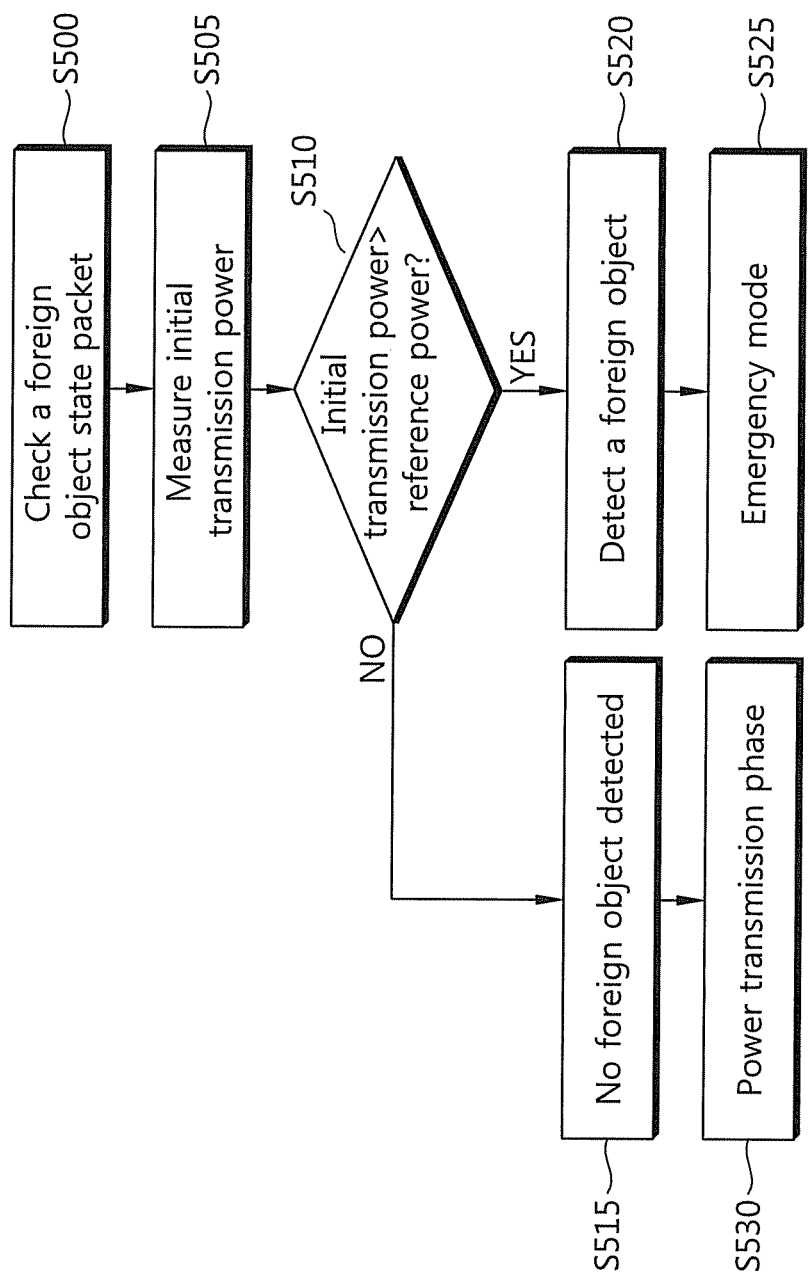
FIG. 5 is a flow diagram illustrating a method for performing foreign object detection according to one embodiment of the present invention.

FIG. 5 is a flow diagram illustrating a method for performing foreign object detection according to one embodiment of the present invention.

With reference to FIG. 5, the wireless power transmitting apparatus checks a foreign object state packet received from the wireless power receiving apparatus at S500. If the received packet is not the foreign object state packet, the wireless power transmitting apparatus starts normal charging. In other words, the wireless power transmitting apparatus enters the power transmission phase.

To make sure a received packet corresponds to the foreign object state packet, the wireless power transmitting apparatus checks whether the header of a received packet or the value of a message indicates the foreign object state packet. For example, in case the header is 0x00, or in the case the header is 0x05 and the value of the message is 0x00, the wireless power transmitting apparatus may identify the packet received from the wireless power receiving apparatus as corresponding to the foreign object state packet.

Since the foreign object state packet is transmitted from the wireless power receiving apparatus to the wireless power transmitting apparatus when the initial voltage $V_i$ is in a hold state (or when the initial setting is completed), the foreign object state packet may also be called an initial setting complete packet. That is, the wireless power transmitting apparatus may recognize the completion of an initial setting of the wireless power receiving apparatus by receiving the foreign object state packet. Similarly, since the wireless power transmitting apparatus starts foreign object detection by receiving the foreign object state packet, the foreign object state packet may also be called a foreign object confirmation request packet.

While the initial setting of the wireless power receiving apparatus is completed, the wireless power transmitting apparatus enters the foreign object detection phase and measures an initial transmission power $P_i$ generated in the primary coil at S505. Then the wireless power transmitting apparatus compares the initial transmission power $P_i$ with a reference power $P_R$ at S510. The parameters such as the reference power $P_R$ may be stored beforehand in the control unit 230 as the initial setting values or may be obtained later through the configuration information received from the wireless power receiving apparatus.

If the initial transmission power $P_i$ is smaller than or equal to the reference power $P_R$, the wireless power transmitting apparatus determines that no foreign object is detected. In other words, the wireless power transmitting apparatus is unable to detect a foreign object at S515. If no foreign object is detected, the wireless power transmitting apparatus enters the power transmission phase at S530.

On the other hand, if the initial transmission power $P_i$ is larger than the reference power $P_R$, the wireless power transmitting apparatus determines that a foreign object has been detected. In other words, the wireless power transmitting apparatus may detect a foreign object at S520. If a foreign object is detected, the wireless power transmitting apparatus may operate in emergency mode at S525.

Here, the reference power $P_R$ is the power transmitted through the primary coil when no foreign object exists and when the wireless power transmitting apparatus is in a steady state before transmission of wireless power is started, which is a value that may be obtained experimentally. In other words, the reference power $P_R$ corresponds to the power transmitted through the primary coil when there is no foreign object and the initial setting of the wireless power receiving apparatus is completed. The reference power $P_R$ may be the power consumed internally within the wireless power transmitting apparatus.

If a foreign object such as metal comes between the wireless power transmitting apparatus and wireless power receiving apparatus, a certain predetermined amount of leakage current $I_{leakage}$ flows through the primary coil even before a reference AC signal is applied, and an initial transmission power $P_i$ is transmitted from this time on. This indicates that a certain predetermined amount of power $(P_i\text{-}P_R)$ is consumed continuously due to foreign objects even while the wireless power transmitting apparatus is in an initial setting state before entering the power transmission phase. Therefore, the wireless power transmitting apparatus may detect an element causing interference on the transmission of wireless power, for example a foreign object such as metal, on the basis of the initial transmission power $P_i$ and reference power $P_R$.

Assuming that the wireless power transmitting apparatus performs foreign object detection in the power transmission phase, after estimating power loss on the basis of the value of transmission power with respect to the received power of the wireless power receiving apparatus, the error in detecting foreign objects then becomes large, due to the difference of loss between individual samples of the wireless power transmitting apparatus and wireless power receiving apparatus and due to the deviation according to charging positions. Accordingly, due to a delay in detecting a foreign object, a risk due to heating of a foreign object is increased. On the other hand, according to the present embodiment, foreign object detection is performed in the initial setting complete state before output of the wireless power receiving apparatus is turned on; thus, a time delay in detecting a foreign object may be reduced and the risk due to heating of the foreign object may be avoided beforehand.

Figure 6:
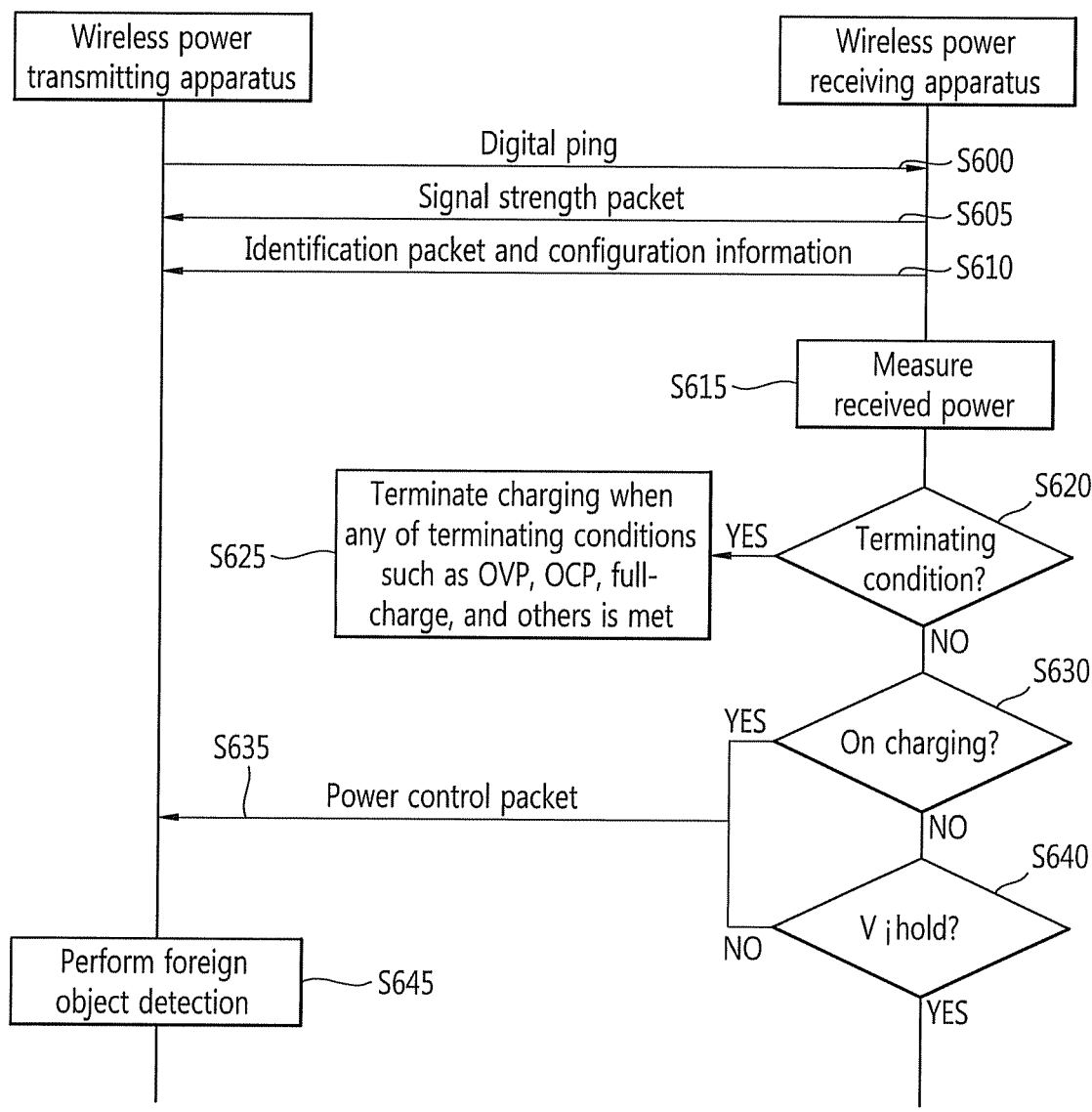
FIG. 6 is a flow diagram illustrating a method for performing foreign object detection in a wireless power transmitting system according to another embodiment of the present invention.

FIG. 6 is a flow diagram illustrating a method for performing foreign object detection in a wireless power transmitting system according to another embodiment of the present invention.

With reference to FIG. 6, the operations at S600 to S640 are the same as the operations at S400 to S440 respectively.

It should be noted, however, that the wireless power transmitting apparatus of FIG. 4 explicitly receives the foreign object state packet at S445 and enters the foreign object detection phase, but the wireless power transmitting apparatus of FIG. 6 may implicitly enter the foreign object detection phase without receiving the foreign object state packet. In this regard, the method for detection foreign objects of FIG. 6 differs from that of FIG. 4. Therefore, the wireless power transmitting apparatus may enter the foreign object detection phase autonomously and then perform foreign object detection at S645. This is allowed because the wireless power transmitting apparatus, by receiving identification packet and configuration information from the wireless power receiving apparatus in the ID identification and configuration phase, is expected to enter the foreign object detection phase promptly.

The terms "foreign object" and "foreign objects" have been used interchangeably above. It will be understood that the principles and embodiments disclosed may be used to detect and respond to either one or multiple foreign objects.

All of the aforementioned functions may be performed by a processor including but not limited to a microprocessor, controller, microcontroller, or ASIC (Application Specific Integrated Circuit) controlled by software or program codes implemented to perform the functions. It should be noted that the design, development, and implementation of the codes would be understood clearly to those skilled in the art on the basis of the descriptions of the present invention.

So far, the present invention has been described with reference to embodiments. It should be understood by those skilled in the art, however, that the present invention may be modified or changed in various ways without departing from the technical principles and scope. Therefore, the present invention is not limited to the embodiments above, but the present invention includes all of the embodiments belonging to the technical scope of the present invention defined by the appended claims.

By performing foreign object detection while a wireless power receiving apparatus is in an initial setting completion state, before the output of the wireless power receiving apparatus is turned on, delay in detecting foreign objects may be reduced, and a risk due to heating of a foreign object may be avoided.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A wireless power transmitting apparatus comprising:
a primary coil configured to transmit wireless power to a secondary coil in a wireless power receiving apparatus; and a control unit configured to manage transmission of the wireless power via the primary coil, the control unit configured to:

perform a digital ping that includes transmission of a power signal at an initial operating point for a ping phase, wherein an initial voltage of the power signal at the initial operating point for the ping phase is lower than a power transmission voltage for the transmission of wireless power in a power transfer phase;

receive, from the wireless power receiving apparatus, a signal strength packet within a time window following the digital ping, the signal strength packet indicating a strength of the power signal measured by the wireless power receiving apparatus;

receive identification and configuration information from the wireless power receiving apparatus;

receive a foreign object detection status packet from the wireless power receiving apparatus, the foreign object detection status packet initiating a foreign object detection procedure of the wireless power transmitting apparatus;

obtain a reference value from the wireless power receiving apparatus, wherein the reference value is an experimentally measured amount of power expected from the primary coil when no foreign object is present and the primary coil is configured for transmission of the power signal in a steady state of the initial voltage;

determine an initial transmission power value representing an amount of power associated with the primary coil configured for transmission of the power signal in the steady state of the initial voltage;

determine whether a foreign object is detected based on a difference between the initial transmission power value and the reference value; and determine whether to enter into the power transfer phase to transmit wireless power based on a determination of whether the foreign object is detected, wherein the power transfer phase includes the transmission of the wireless power at the power transmission voltage.

2. The apparatus of claim 1,
wherein the foreign object detection status packet comprises a preamble, a header, a message, and a checksum,
wherein each of the header and the message has one byte respectively, and
wherein an value of the header is 0x05, and an value of the message is 0x00.

3. The apparatus of claim 1, wherein the initial operating point is based on an initial transmission power generated in the primary coil before the power transfer phase.

4. A method of detecting one or more foreign objects using a wireless power transmitting apparatus equipped with a primary coil, the method comprising:

performing a digital ping that includes transmission of a power signal at an initial operating point for a ping phase, wherein an initial voltage of the power signal at the initial operating point for the ping phase is lower than a power transmission voltage for the transmission of wireless power in a power transfer phase;

receiving, from the wireless power receiving apparatus, a signal strength packet within a time window following the digital ping, the signal strength packet indicating a strength of the power signal measured by the wireless power receiving apparatus;

receiving identification and configuration information from the wireless power receiving apparatus;

receiving a foreign object detection status packet from the wireless power receiving apparatus, the foreign object detection status packet initiating a foreign object detection procedure of the wireless power transmitting apparatus;

obtaining a reference value from the wireless power receiving apparatus, wherein the reference value is an experimentally measured amount of power expected from the primary coil when no foreign object is present and the power signal is in a steady state of the initial voltage, determining an initial transmission power value representing an amount of power associated with the primary coil configured for transmission of the power signal in the steady state of the initial voltage, and determining whether a foreign object is detected based on a difference between the initial transmission power value and the reference value; and determining whether to enter into the power transfer phase to transmit wireless power based on a determination of whether the foreign object is detected, wherein the power transfer phase includes the transmission of the wireless power at the power transmission voltage.

5. The method of claim 4,
wherein the foreign object detection status packet comprises a preamble, a header, a message, and a checksum,
wherein each of the header and the message has one byte respectively, and
wherein an value of the header is 0x05, and an value of the message is 0x00.

6. The method of claim 4, wherein the initial operating point is based on an initial transmission power generated in the primary coil before the power transfer phase.

7. The method of claim 4,
wherein the foreign object detection status packet initiates a foreign object detection procedure that includes a comparison to determine the difference between the initial transmission power value and the reference value.

8. The method of claim 4, further comprising:
receiving a power control packet from the wireless power receiving apparatus, wherein the wireless power transmitting apparatus enters the power transfer phase based, at least in part, on receiving the power control packet.

* * * * *